United States Patent [19]

Kimura

[11] 4,407,618

[45] Oct. 4, 1983

[54] FASTENER

[75] Inventor: Shigeru Kimura, Kamakura, Japan

[73] Assignee: Nifco Inc., Yokohama, Japan

[21] Appl. No.: 241,316

[22] Filed: Mar. 6, 1981

[30] Foreign Application Priority Data

Mar. 12, 1980 [JP] Japan .............................. 55-31011[U]

[51] Int. Cl.³ ......................... F16B 13/06; F16B 13/14
[52] U.S. Cl. ........................................ 411/40; 411/48; 411/908
[58] Field of Search ....................... 411/40, 39, 41, 64, 411/63, 68, 57, 59, 50, 49, 45, 46, 44, 38, 15, 48, 908

[56] References Cited

U.S. PATENT DOCUMENTS

| 1,469,668 | 10/1923 | Karitzky | 411/57 |
| 3,313,083 | 4/1967 | Flora | 411/38 X |
| 3,623,396 | 11/1971 | Mortensen | 411/46 |
| 3,741,067 | 6/1973 | Moran | 411/39 |
| 4,284,378 | 8/1981 | Mizusawa | 411/40 X |

FOREIGN PATENT DOCUMENTS

| 1450998 | 4/1969 | Fed. Rep. of Germany | 411/71 |
| 1152578 | 5/1969 | United Kingdom | 411/57 |
| 1309392 | 3/1973 | United Kingdom | 411/51 |

Primary Examiner—Cornlius J. Husar
Assistant Examiner—N. Wilson
Attorney, Agent, or Firm—Trexler, Bushnell & Wolters, Ltd.

[57] ABSTRACT

A fastener comprises a base formed of a flange and a plurality of leg pieces and a screw-receiving member adapted to be embraced between the leg pieces, whereby it is secured onto a given panel by a procedure which involves inserting the leg pieces into a fitting hole bored in advance in the panel, then inserting a fastening screw through a through hole formed in the flange into a screw hole formed within the screw-receiving member, imparting a helical motion of the fastening screw thereby drawing the screw-receiving member toward the flange, consequently causing the leg pieces to be spread outwardly within the fitting hole of the panel and brought into tight engagement with the fitting hole and, at the same time, enabling the fastening screw to be secured onto the panel through the medium of the base.

4 Claims, 7 Drawing Figures

FASTENER

BACKGROUND OF THE INVENTION

This invention relates to a fastener molded of a synthetic resin to be used for fastening a panel or a part possessing a panel-shaped fitting ear to the panel portion of the main body such as of an automobile or electric appliance.

There have heretofore been proposed various fasteners such as a fastener for fastening two panels to each other or a panel to a part, which fastener comprises a flange-shaped head having a through hole at the center thereof and a leg extended downwardly from the lower surface of the head and divided into two leg pieces, and enables the fastening to be accomplished by helically inserting a fastening screw through the through hole of the head between the divided leg pieces, thereby forcibly spreading the leg pieces outwardly by the diameter of the shaft of the fastening screw. In such a fastener, however, since the helical insertion of the fastening screw directly imparts the spreading of the leg pieces, the width at which the leg pieces are spread outwardly, i.e. the expansion of the leg pieces, cannot be expected to an extent larger than the diameter of the shaft of the fastening screw. For this reason, such a fastener has a disadvantage in that complete engagement between the fastener and the panel cannot be obtained if there exists variation in the size of the hole in the panel, which variation is larger than the prescribed size.

SUMMARY OF THE INVENTION

An object of this invention is to provide a fastener which comprises a base formed of a flange and a plurality of leg pieces and a screw-receiving member adapted to be embraced between the aforementioned leg pieces, whereby it is secured onto a given panel by a procedure which involves inserting the aforementioned leg pieces into a fitting hole bored in advance in the panel, then inserting a fastening screw through a through hole formed in the flange into a screw hole formed within the screw-receiving member, imparting a helical motion of the fastening screw thereby drawing the aforementioned screw-receiving member toward the flange, consequently causing the leg pieces to be spread outwardly within the fitting hole and brought into tight engagement with the fitting hole and, at the same time, enabling the fastening screw to be secured onto the panel through the medium of the aforementioned base.

The fastener is characterized by causing the leg pieces extended downwardly from the lower surface of the flange to be spread outwardly within the fitting hole in the panel thereby fitting the fastener tightly onto the panel by virtue of the squeezing force exerted by the leg pieces and the flange upon the panel and, consequently, allowing for more or less variation in the size of the fitting hole formed in the panel and for more or less variation in the thickness of the panel, and further characterized by enabling another panel or part to be fastened to the first panel by the insertion of the fastening screw into the first panel via the fastener of this invention.

Other objects and characteristics of the present invention will become apparent from a further disclosure to be given in detail hereinafter with reference to the accompanying drawing.

DETAILED DESCRIPTION OF PREFERRED EMBODIMENT

Figure 1:
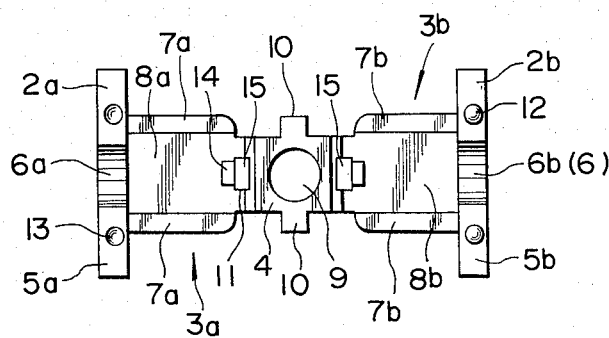
FIG. 1 is a plan view of the fastener according to the present invention, with the base thereof held in a developed condition.
Figure 2:
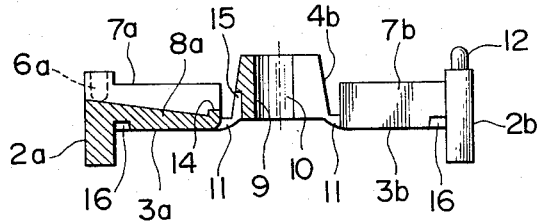
FIG. 2 is a front view of the fastener of FIG. 1, with the left half sectional along the central line.
Figure 4:
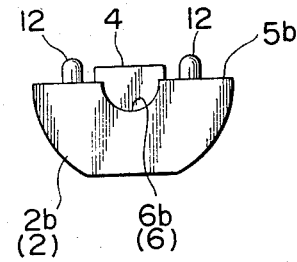
FIG. 4 is a righthand side view of the fastener of FIG. 1.
Figure 3:
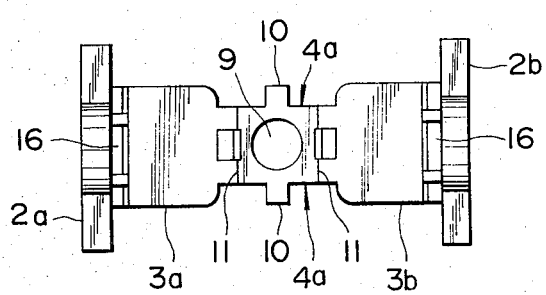
FIG. 3 is a bottom view of the fastener of FIG. 1.

Now, the fastener provided by this invention will be described with reference to the example illustrated in the accompanying drawing. This example is one embodiment of the fastener of this invention which is specifically intended to be molded of a synthetic resin.

In the drawing, 2a and 2b denote portions which compose a flange 2 in a base 1, and 3a and 3b denote leg pieces which are vertically extended from the lower sides of the portions 2a, 2b, and 4 denotes a screw-receiving member.

The portions 2a, 2b are symmetrically formed. In the centers of the corresponding edge surfaces 5a, 5b of these portions are formed semicircular indentations 6a, 6b adapted so that when the edge surfaces are abutted against each other to complete the flange 2, these indentations give rise to one circular through hole 6. The leg pieces 3a, 3b which are elongations of the respective portions 2a, 2b are symmetrically extended from the portions avoiding the respective indentations to a fixed length.

The leg pieces 3a, 3b in the illustrated embodiment are in the shape of plates of a large wall thickness, and they are provided along the opposite longitudinal edges thereof with two parallel guide pieces 7a, 7a and 7b, 7b. Consequently, these leg pieces each have a cross section of the general shape of three sides of a square. In the two leg pieces, the symmetric inner walls 8a, 8b are gradually thinned from the lower surface sides of the portions 2a, 2b toward the leg end sides so that their upper surfaces are inclined relative to the outer side surfaces lying perpendicularly to the lower surfaces of the portions 2a, 2b.

The screw-receiving member 4 has its front and rear surfaces 4a, 4a formed in vertical planes separated by a distance smaller than the distance between the opposed guide pieces formed on the aforementioned leg pieces. Consequently, the screw-receiving member 4 is allowed to enter the spaces to be enclosed with the guide pieces. The right and left surfaces 4b, 4b of the screw-receiving member are formed in inclined planes corresponding to the inclination of the upper surfaces of the inner walls 8a, 8b. As a result, the screw-receiving member acquires an overall shape such that the cross section thereof taken along the central line is a regular trapezoid. The screw-receiving member 4 is provided at the center thereof with a screw hole 9 pierced throughout in the entire thickness thereof, and it is provided at the centers of the aforementioned front and rear surfaces with sliding protuberances 10, 10 one each.

In the illustrated embodiment, this screw-receiving member 4 is connected at the lower edges of the right and left inclined surfaces 4b, 4b thereof to the leading ends of the aforementioned leg pieces 3a, 3b through the medium of hinge pieces 11, 11 of a thin wall, so that the portions 2a, 2b destined to complete a flange and the leg pieces 3a, 3b annexed to these portions are formed integrally with the screw-receiving member 4 at the center and disposed symmetrically relative to the screw-receiving member. When the right and left leg pieces 3a, 3b are bent upward about the aforementioned hinge pieces 11, 11 as the fulcrums and raised until they lie parallelly to the right and left inclined surfaces 4b, 4b of the screw-receiving member 4, the portions 2a, 2b have their respective end faces 5a, 5b abut each other to form a flange 2 above the screw-receiving member and, at the same time, the semicircular indentations 6a, 6a are combined to complete a circular through hole 6 at a position directly above the screw hole 9 which is formed at the center of the screw-receiving member. In consequence of this upright raising of the leg pieces 3a, 3b, the screw-receiving member itself is contained within the leg pieces and, at the same time, the sliding protuberances 10, 10 formed on the front and rear surfaces of the screw-receiving member are slid into the spaces to be enclosed between the opposed guide pieces 7a, 7b.

In this embodiment, the flange 2 and the leg pieces 3a, 3b which make up the base 1 are divided centrally into two sections and the two divided sections are joined to the right and left sides of the screw-receiving member 4 via the hinge pieces 11, 11. The fastener of this invention is molded in a form in which these divided sections are fully spread out. Thus, the base and the screw-receiving member can be integrally molded within one molding chamber.

In the drawing, 12 and 13 denote protuberances and depressions provided on the end surfaces 5a, 5b of the portions 2a, 2b of the flange. They are adapted so that when the end surfaces are abutted against each other, they come into tight engagement enough to ensure desired unity of the completed flange. By 14 are denoted projections raised from the ends of the aforementioned leg pieces 3a, 3b on the innermost sides of the inclined inner walls and, by 15 are denoted recesses formed on the inclined surfaces 4b, 4b of the screw-receiving member and adapted for engagement with the projections 14 so as to keep the screw-receiving member from accidental fall.

In the case of the present embodiment, the fastener constructed as described above is rendered serviceable in a condition in which the portions 2a, 2b are abutted against each other and, consequently, the screw-receiving member 4 is embraced between the leg pieces 3a, 3b. Attachment of the fastener is accomplished by a procedure which involves inserting into a fitting hole a bored in advance in a panel A the leg pieces 3a, 3b raised upright on both sides of the screw-receiving member 4, allowing the lower surface of the flange 2 formed by the mutual collision of the divided portions thereof to come into intimate contact with the panel surface and remain in a temporarily fastened state thereon, placing another panel B desired to be fastened to the panel A on top of the upper surface of the flange 2, adjusting the position of the panel B so that the hole b bored in advance in the panel B will exactly correspond to the through hole 6, and helically driving a fastening screw C through the hole b and the through hole 6 into the screw hole 9 in the screw-receiving member 4.

Figure 6:
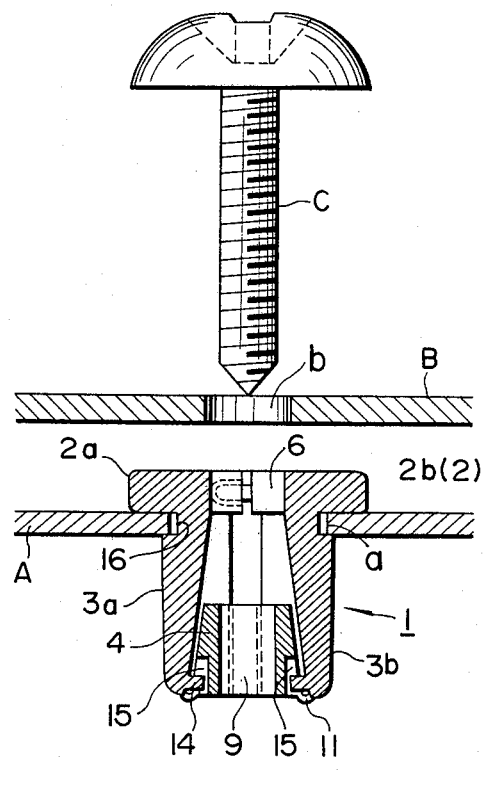
FIG. 6 is an enlarged, centrally sectioned view of the fastener of FIG. 1 in a condition in which the fastener is temporarily fastened to the fitting hole in the panel.

FIG. 6 illustrates in an exploded sectioned view the condition in which the fastening screw C is readied for helical insertion into the screw hole 9. When the fastening screw C is pushed in the screw hole 9 and then rotated about its axis, the screw-receiving member 4 causes the fastening screw C to advance into the screw hole 9 because the member 4 itself is not allowed to rotate about its axis with the inclined inner walls 8a, 8b of the leg pieces 3a, 3b kept in tight contact with the right and left surfaces 4b, 4b. In consequence of this advance of the fastening screw C, the screw-receiving member 4 is gradually drawn toward the flange 2 side. As a result, the leg pieces 3a, 3b which have the inner walls 8a, 8b inclined as described above are pushed outwardly in proportion to the advance of the screw-receiving member 4 and are diverged on the other side of the panel A to a point where they are no longer pulled out of the fitting hole a. Finally, the fastening screw C is tightened fast on the screw-receiving member. The panel B on the upper surface of the flange 2, therefore, is fastened to the panel A completely.

Figure 7:
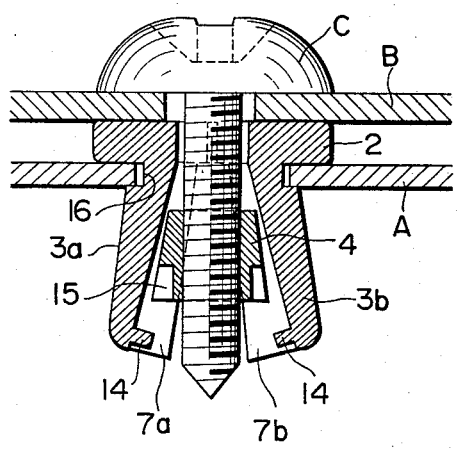
FIG. 7 is an enlarged, centrally sectioned view of the fastener of FIG. 1 in a condition in which the fastener has been secured tightly to the panel.

FIG. 7 shows in a sectioned view the condition in which the fastening of the panel described above is completed. As illustrated, the panel B is fastened to the panel A though the medium of the fastener across a space equivalent to the thickness of the flange 2. In the illustrated embodiment, grooves 16, 16 are formed in the outer surface close to the base portions of the leg pieces 3a, 3b for the purpose of admitting the edges of the fitting hole a while the leg pieces are being spread out thereby facilitating the engagement of the leg pieces with the fitting hole a and, at the same time, enabling the opening of the leg pieces due to the ascent of the screw-receiving member to proceed smoothly with the grooved base portions as the fulcrums.

In this case, the screw-receiving member can be kept fastened to the leg pieces 3a, 3b via the hinge pieces 11, 11 until the ascent of the screw-receiving member 4 is started by the helical insertion of the fastening screw. Once the screw-receiving member is raised, it is cut off the aforementioned hinge pieces. When the fastening screw is pulled out to terminate the union of the two panels, there is a possibility that the screw-receiving member will fall off between the leg pieces. The aforementioned projections 14 and recesses 15 serve as means for preventing this accidental fall of the screw-receiving member in this case. The screw-receiving member from which the fastening screw has been removed, therefore, is allowed to descend as contained fast between the leg pieces and is prevented from otherwise possible fall by the engagement between the recesses 15 and the projections 14 on the leg pieces. In the resultant condition, therefore, the fastener can be put to reuse. When this fastener is used on a panel whose rear side refuses access of the worker's hand, therefore, the fact that the base and the screw-receiving member are held in a combined state proves to be advantageous for the fastening.

The fastener of the present invention has been described with reference to the illustrated embodiment. As described above, the fastener is secured strongly to the panel by the biting force exerted by the flange and the leg pieces on the edge of the fitting hole of the panel because the fastening of the fastener to the panel is effected by the spreading of the leg pieces and this spreading of the leg pieces is obtained forcibly by the movement of the screw-receiving member due to the helical insertion of the fastening screw. Moreover, this fastener allows for more or less errors in the diameter of the fitting hole bored in advance in the panel and in the thickness of the panel itself because the width of the spreading of the leg pieces can be adjusted by the inclination and length of the inner walls of the leg pieces, namely the distance of the movement of the screw-receiving member.

The illustrated embodiment represents a case wherein the base formed of a flange and leg pieces is molded integrally with the screw-receiving member. The fastener of this invention is not limited to this embodiment. Optionally, the base and the screw-receiving member may be separately molded and afterward combined into one unit preparatory to use. The number of leg pieces is not specifically limited to 2. Increase of this number to 3, 4 and so on will not obstruct the advantageous working of this invention. The actual working of the fastener of this invention may be accomplished as illustrated in the drawing by opposing two panels, A, B across the flange and then pressing them to the fastener by the helical insertion of the screw. Optionally, two panels may be fastened directly face-to-face by placing the two panels one on top of the other, inserting the leg pieces through the fitting holes bored in advance through the panels, and inserting the fastening screw through the hole in the flange into the screw-receiving member. The manner in which the fastener of this invention is put to use may be freely selected by the user on condition that the characteristics of this invention described above are utilized to advantage.

Since the fastener of this invention has the leg pieces thereof spread out by the upward movement of the screw-receiving member due to the helical insertion of the fastening screw, it is advisable to avoid giving a true circular shape to the overall cross section of the entire leg pieces, particularly the overall cross section destined to be opposed to the fitting hole in the panel, as well as to the fitting hole in the panel. To avoid sympathetic rotation of the fastener, the leg pieces and the fitting holes are desired to be given a rectangular or polygonal shape.

What is claimed is:

1. An integral molded plastic fastener comprising a plurality of legs each having an entering end and having an outwardly directed flange means at the opposite end, a polygonal screw receiving member disposed between said legs and having a central axial bore for receipt of a screw, and a plurality of integral hinges initially joining said leg entering ends to said screw receiving member enabling said legs to be moved from an initial splayed molded position to installation position with said legs in substantial parallelism embracing said screw receiving member, said legs having tapering surfaces confronting said screw receiving member which are in installation position spaced apart a predetermined maximum distance at said entering end and which taper toward one another approaching said flange means, said screw receiving member having tapering surfaces confronting sald leg confronting surfaces and spaced a maximum dimension adjacent said hinges and tapering towards one another away from said hinges said legs being adapted to be inserted through a hole in a panel to abut said flange means against a surface of said panel, a screw inserted past said flange means and threaded into said screw receiving member pulling said screw receiving member towards said flange means and causing the confronting tapering surfaces to cam said legs apart to fracture said hinge and to spread said legs apart on the opposite side of said panel from the surface engaged by said flange means.

2. A fastener as set forth in claim 1 wherein said legs have exterior notches adjacent said flanges for receipt of edge portions of said panel adjacent to said hole.

Figure 5:
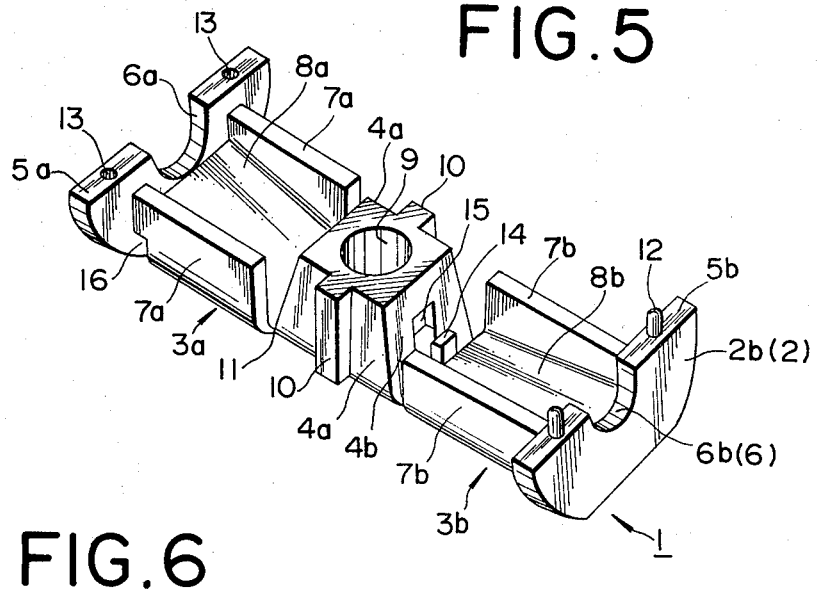
FIG. 5 is an enlarged perspective view of the fastener of FIG. 1.

3. A fastener as set forth in FIG. 5 wherein said screw receiving member and said legs have interfitting means preventing said screw receiving member from moving from between said legs upon removal of said screw after fracturing of said hinges.

4. A fastener as set forth in claim 3 wherein said interfitting means comprises recess means in said screw receiving member and projections on said legs adjacent the entering ends thereof which are received in said recess means.

* * * * *